(12) United States Patent
Choi et al.

(10) Patent No.: US 11,620,824 B2
(45) Date of Patent: Apr. 4, 2023

(54) MOBILE APPARATUS AND CONTROL METHOD THEREOF TO CONTROL AN OBJECT DISPLAYED ON A TARGET DEVICE

(71) Applicant: SAMSUNG ELECTRONICS CO., LTD., Suwon-si (KR)

(72) Inventors: Eun Young Choi, Suwon-si (KR); Min Sun Park, Suwon-si (KR); Sung Hyun Jang, Suwon-si (KR); Ji-Youn Han, Suwon-si (KR); Soo Hyun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/284,566

(22) PCT Filed: Feb. 19, 2019

(86) PCT No.: PCT/KR2019/001941
§ 371 (c)(1),
(2) Date: Apr. 12, 2021

(87) PCT Pub. No.: WO2020/075926
PCT Pub. Date: Apr. 16, 2020

(65) Prior Publication Data
US 2021/0342590 A1      Nov. 4, 2021

(30) Foreign Application Priority Data
Oct. 12, 2018   (KR) .......................... 10-2018-0121739

(51) Int. Cl.
*G06F 3/0346* (2013.01)
*G06V 20/20* (2022.01)
(Continued)

(52) U.S. Cl.
CPC ............ *G06V 20/20* (2022.01); *G06F 3/0346* (2013.01); *G06F 3/0482* (2013.01);
(Continued)

(58) Field of Classification Search
CPC .. G06V 20/20; G06V 2201/02; G06F 3/0346; G06F 3/0482; G06F 3/04845;
(Continued)

(56) References Cited

U.S. PATENT DOCUMENTS 10,043,406 B1 * 8/2018 Huang ............. H04N 21/44008
10,453,263 B2 * 10/2019 Khalid .................. G06T 19/006
(Continued)

FOREIGN PATENT DOCUMENTS

EP           2 744 218 A1       6/2014
KR      10-2011-0118421           10/2011
(Continued)

OTHER PUBLICATIONS

Augmented Reality on Your Television—TWiT Tech Podcast Network <https://www.youtube.com/watch?v=lpj90PkfPJ8> (Year: 2018).*
(Continued)

*Primary Examiner* — Beau D Spratt
(74) *Attorney, Agent, or Firm* — Staas & Halsey LLP

(57) ABSTRACT

In order to provide information related to content played on a target device within a visual field or a field of view (FOV) of the camera's, and to control the target device, a mobile apparatus according to an embodiment of present disclosure includes: a display; a camera configured to photograph a target device; a user interface configured to receive user's input; and a controller configured to control the display to display the image of the target device photographed by the camera and information related to an object included in the content being played by the target device in response to the user's input.

11 Claims, 24 Drawing Sheets

(51) Int. Cl.
　　　*G06F 3/0482*　　　(2013.01)
　　　*G06F 3/04845*　　(2022.01)
　　　*G06F 3/04883*　　(2022.01)
　　　*H04W 88/02*　　　(2009.01)

(52) U.S. Cl.
　　　CPC ...... *G06F 3/04845* (2013.01); *G06F 3/04883* (2013.01); *G06F 2203/04803* (2013.01); *G06F 2203/04806* (2013.01); *G06V 2201/02* (2022.01); *H04W 88/02* (2013.01)

(58) Field of Classification Search
　　　CPC ....... G06F 3/04883; G06F 2203/04803; G06F 2203/04806; H04W 88/02
　　　See application file for complete search history.

(56) References Cited

U.S. PATENT DOCUMENTS

| | | | |
|---|---|---|---|
| 2011/0138317 A1* | 6/2011 | Kang | H04N 21/42224 715/780 |
| 2014/0098134 A1* | 4/2014 | Fein | G06T 19/006 345/633 |
| 2017/0108936 A1* | 4/2017 | Feinstein | G06F 3/0346 |
| 2017/0201808 A1* | 7/2017 | Chowdhary | G02B 27/017 |
| 2018/0089871 A1 | 3/2018 | Ko et al. | |
| 2019/0391716 A1* | 12/2019 | Badr | H04N 21/43615 |
| 2019/0392640 A1* | 12/2019 | Qian | G06F 3/011 |

FOREIGN PATENT DOCUMENTS

| | | |
|---|---|---|
| KR | 10-2011-0133295 | 12/2011 |
| KR | 10-2012-0076541 | 7/2012 |
| KR | 10-1612957 | 4/2016 |
| KR | 10-2016-0086717 | 7/2016 |
| KR | 10-1722784 | 4/2017 |
| KR | 10-2017-0092632 | 8/2017 |
| KR | 10-2018-0020887 | 2/2018 |

OTHER PUBLICATIONS

European Search Report for European Patent Application No. 19870260.7 dated Oct. 20, 2021.
International Search Report dated Jul. 31, 2019 in International Patent Application No. PCT/KR2019/001941.

* cited by examiner

FIG.10
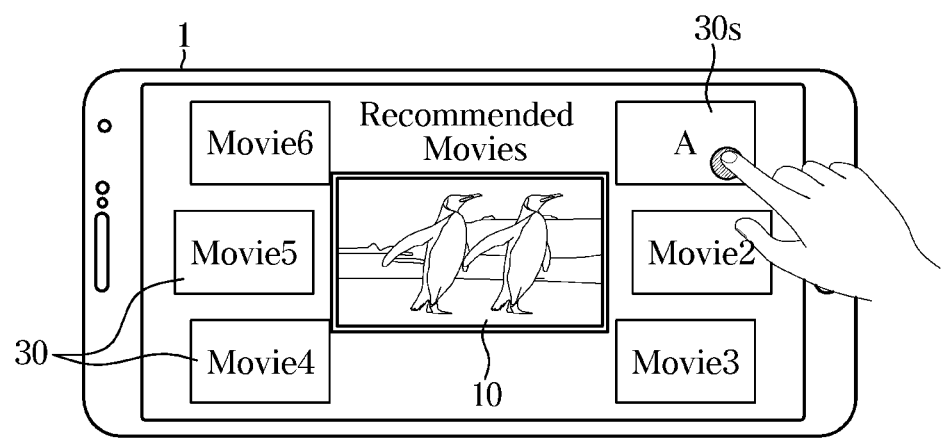
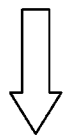
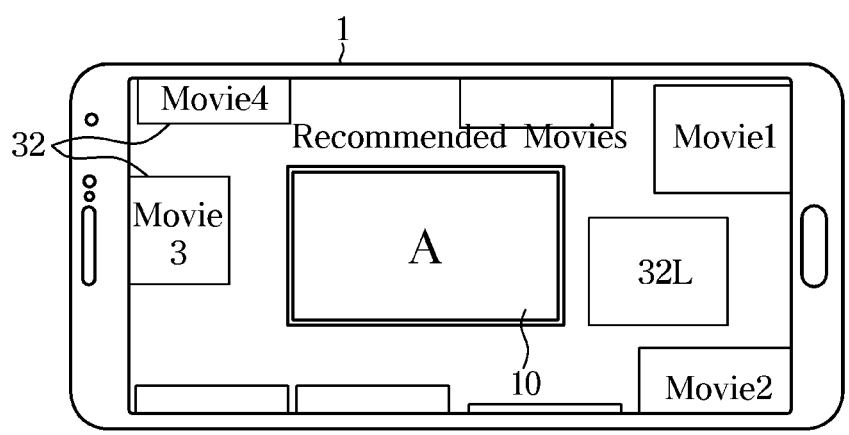

FIG.12
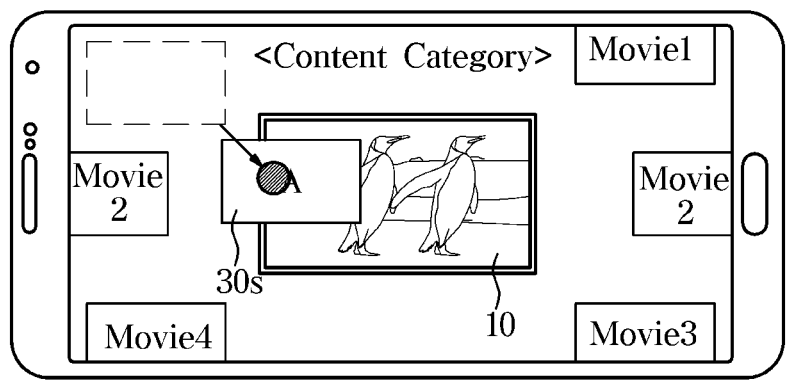
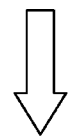
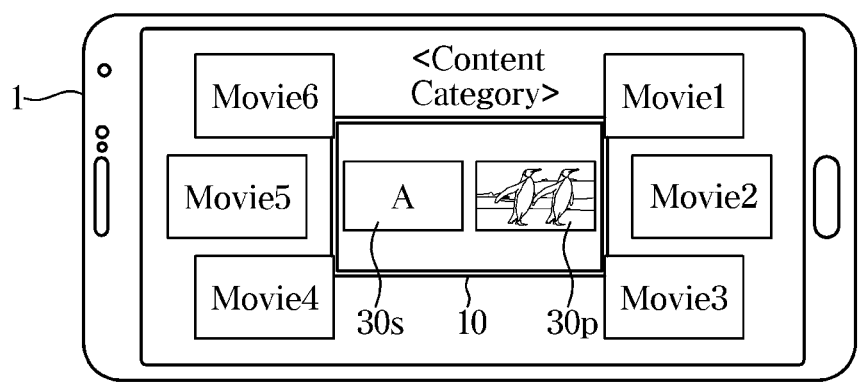

FIG.14
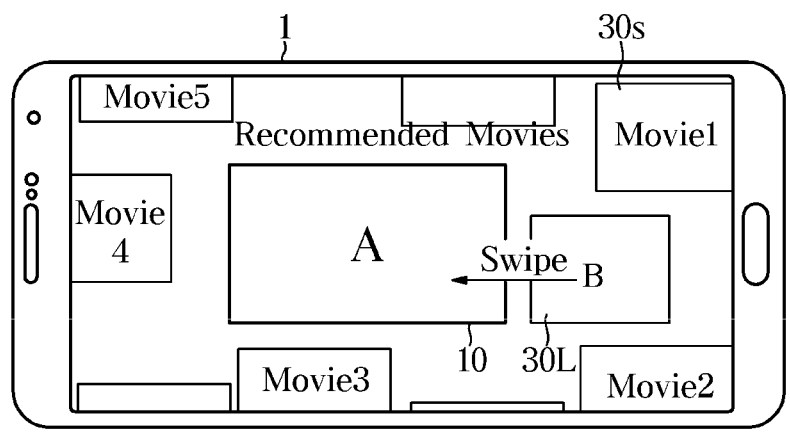
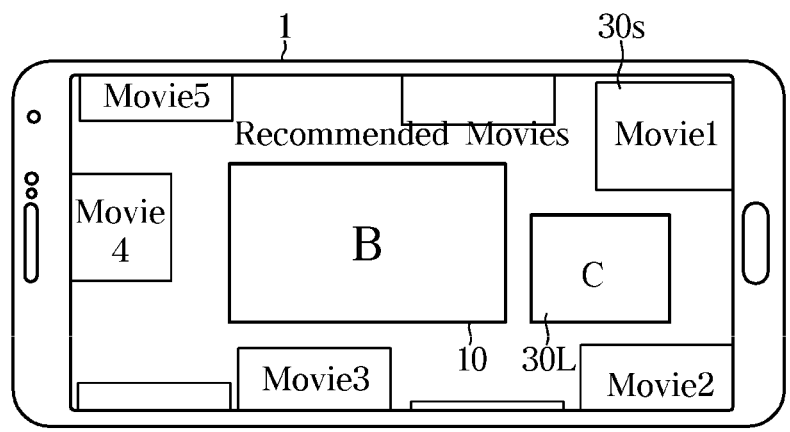

FIG.19
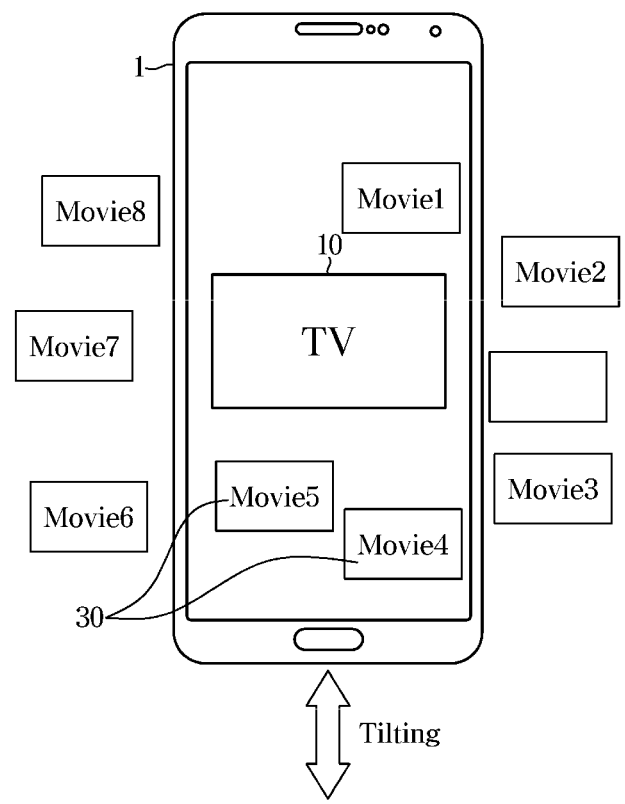
Tilting
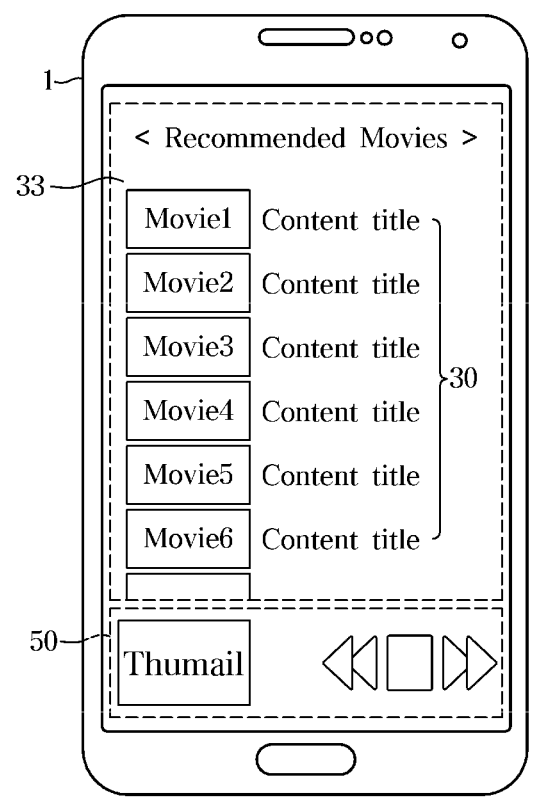

MOBILE APPARATUS AND CONTROL METHOD THEREOF TO CONTROL AN OBJECT DISPLAYED ON A TARGET DEVICE

CROSS-REFERENCE TO RELATED APPLICATIONS

This application is a U.S. National Stage Application, which claims the benefit under 35 U.S.C. § 371 of PCT International Patent Application No. PCT/KR2019/001941, filed Feb. 19, 2019 which claims the foreign priority benefit under 35 U.S.C. § 119 of Korean Patent Application No. 10-2018-0121739, filed Oct. 12, 2018, the contents of which are incorporated herein by reference.

TECHNICAL FIELD

The present disclosure relates to a mobile apparatus capable of controlling a target device using an augmented reality technology and a control method of the mobile apparatus.

BACKGROUND ART

A mobile apparatus is a device that provides various functions based on mobility and is widely used in various fields. This mobile apparatus includes various function modules to provide various functions. For example, a mobile apparatus includes a camera module that provides an image collection function.

As a technology using a camera module of a mobile apparatus, there is an augmented reality technology. Augmented reality technology refers to a graphic technology that synthesizes virtual objects or virtual information in a real environment to make it look like an object existing in a real environment.

The augmented reality technology synthesizes virtual objects in real spaces, unlike existing virtual reality technologies that are implemented in virtual spaces and virtual objects. Therefore, it has a feature that can reinforce and provide additional information that is difficult to obtain only in the real world. Such augmented reality technology can be applied to a variety of reality environments, and in particular, is in the spotlight as a next-generation display technology suitable for a ubiquitous environment.

DISCLOSURE

Technical Problem

Therefore, it is an aspect of the disclosure to provide a mobile apparatus for recognizing content played on a target device within a visual field or a field of view (FOV) of the camera and an object within the content, and displaying a graphic user interface (GUI) for providing information related to an object in the content and controlling a target device on a display, and a control method of the mobile apparatus.

Technical Solution

In accordance with one aspect of the disclosure, a mobile apparatus includes: a display; a camera configured to photograph a target device; a user interface configured to receive user's input; and a controller configured to control the display to display the image of the target device photographed by the camera and information related to an object included in the content being played by the target device in response to the user's input.

The controller may be configured to control the display to display at least one virtual image including information related to the object around the image of the target device within the field of view (FOV) of the camera, and control the target device in response to the user's input for at least one of the image of the target device and the at least one virtual image.

The controller may be configured to control the display to enlarge and display the virtual image located in the moving direction of the center line of the FOV of the camera.

The controller may be configured to control the target device so that the target device outputs first content corresponding to the selected virtual image in response to the user's input for selecting and moving any one of the at least one virtual image.

The controller may be configured to divide the output area of the target device into a first area and a second area in response to the user's input for additionally selecting and moving the virtual image, and control the target device to output the first content and the second content corresponding to the additionally selected virtual image in the first area and the second area, respectively.

The controller may be configured to control the target device to adjust the size of the first area and the size of the second area in response to the zoom input for the first area or the second area of the target device.

The controller may be configured to control the display to display a screen providing detailed contents of information related to the object in response to the user's input tilting the mobile apparatus.

The controller may be configured to control the display to display a screen providing information on contents corresponding to each of the at least one virtual image as a list in response to the user's input tilting the mobile apparatus.

The mobile apparatus may further include a microphone for receiving a voice command, and the controller may control the target device in response to a voice command received through the microphone.

The mobile apparatus may further include a transceiver for connecting a first external device distinguished from the target device, and the controller may control the transceiver to transmit the screen displayed on the display to the first external device in response to the user's input requesting to share the screen displayed on the display.

In accordance with one aspect of the disclosure, a control method of a mobile apparatus includes: photographing a target device using a camera; identifying an object included in the content being played by the photographed target device in response to a user's input; and displaying the photographed image of the target device and information related to the identified object on a display.

The displaying on the display may include: displaying at least one virtual image including information related to the object around the image of the target device on the display.

The control method may further include controlling the target device in response to the user's input for at least one of the image of the target device and the at least one virtual image.

The displaying at least one virtual image on the display may include: enlarging and displaying the virtual image located in the moving direction of the center line of the FOV of the camera.

The controlling the target device may include: controlling the target device so that the target device outputs first content corresponding to the selected virtual image in response to the user's input for selecting and moving any one of the at least one virtual image.

The controlling the target device may include: dividing the output area of the target device into a first area and a second area in response to the user's input for additionally selecting and moving the virtual image, and controlling the target device to output the first content and the second content corresponding to the additionally selected virtual image in the first area and the second area, respectively.

The controlling the target device may include controlling the target device to adjust the size of the first area and the size of the second area in response to a zoom input for the first area or the second area of the target device.

The control method may further include: displaying a screen providing detailed contents of information related to the object on the display in response to the user's input tilting the mobile apparatus.

The control method may further include: displaying a screen providing information on contents corresponding to each of the at least one virtual image as a list on the display in response to the user's input tilting the mobile apparatus.

The controlling the target device may include controlling the target device in response to a voice command received through a microphone.

The control method may further include: connecting a first external device distinguished from the target device, and transmitting the screen displayed on the display to the first external device in response to the user's input requesting to share the screen displayed on the display.

Advantageous Effects

According to a mobile apparatus and a control method of a mobile apparatus, contents played on a target device within the visual field or the field of view (FOV) of the camera and objects within the content can be recognized, and a graphic user interface (GUI) for providing information related to an object in the content and controlling a target device may be displayed together on the display. Therefore, the user can obtain information in a more intuitive manner and control the target device more easily.

In addition, according a mobile apparatus and to a control method of a mobile apparatus according to an aspect, a plurality of devices may be registered, and a plurality of devices may be controlled simultaneously or in association with the movement of the visual field or the field of view of the camera.

DESCRIPTION OF DRAWINGS

FIGS. 10 to 16 show examples of controlling a target device using a graphic user interface displayed on a display.

FIGS. 17 to 20 are diagrams for illustrating switching of a screen displayed on a display according to a movement of a mobile apparatus.

MODE OF THE INVENTION

Figure 1:
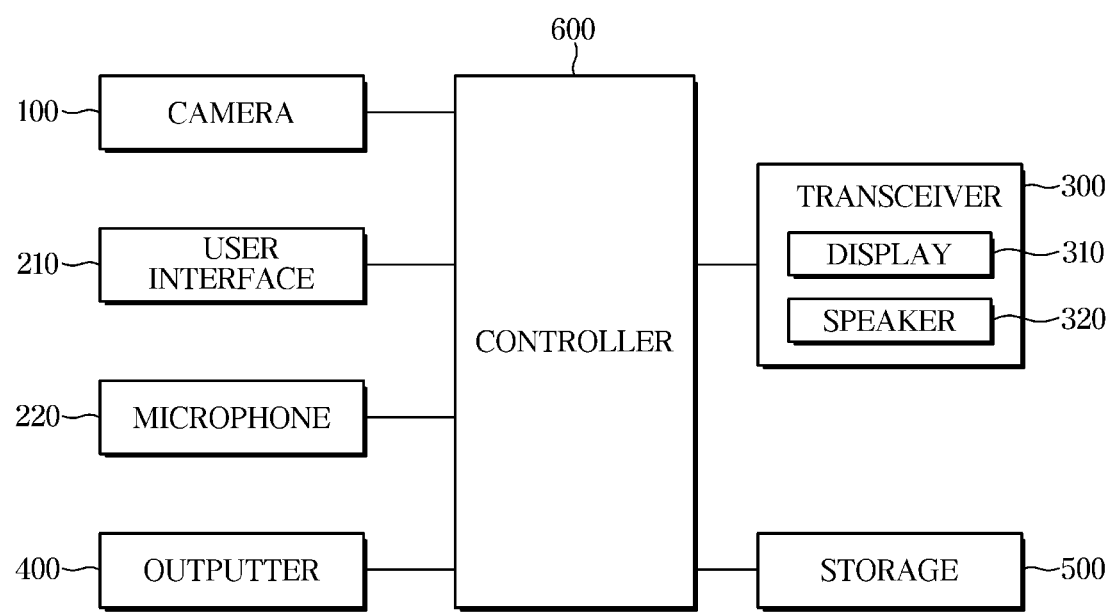
FIG. 1 is a control block diagram of a mobile apparatus according to an embodiment.

Embodiments described herein and configurations illustrated in the accompanying drawings are only certain examples of the disclosure, and various modifications may be made at the time of filing of the present application to replace the embodiments and drawings of the present specification.

The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements. In addition, although the terms including ordinal numbers such as "first" or "second" may be used herein to describe various elements, the elements should not be limited by such terms. The terms are used only for the purpose of distinguishing one component from another. For example, without departing from a scope of the disclosure, a first component may be referred to as a second component, and similarly, the second component may also be referred to as the first component.

In the present specification, the terms such as "comprising," "having" or "including" are intended to designate the presence of characteristics, numbers, steps, operations, elements, parts or combinations thereof, and shall not be construed to preclude any possibility of the presence or addition of one or more other characteristics, numbers, steps, operations, elements, parts or combinations thereof.

As used herein, the terms "portion," "unit," "block," "member," or "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Hereinafter, an embodiment of the disclosure will be described in detail with reference to the accompanying drawings. The same reference numbers or reference numerals illustrated in the accompanying drawings may indicate parts or components that perform substantially the same function.

Figure 2:
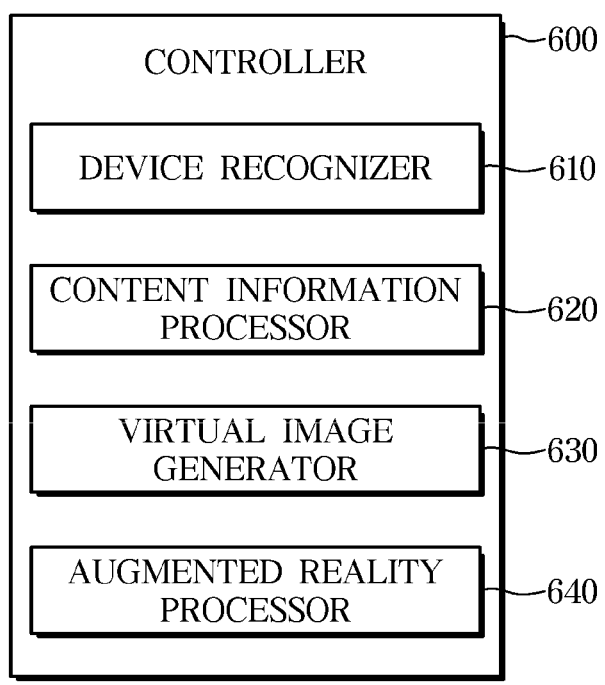
FIG. 2 is a detailed block diagram of the controller shown in FIG. 1.

FIG. 1 is a control block diagram of a mobile apparatus according to an embodiment. FIG. 2 is a detailed block diagram of the controller shown in FIG. 1.

First, the mobile apparatus 1 according to an embodiment includes a device capable of providing augmented reality as a movable device. For example, the mobile apparatus 1 may be implemented as a device capable of providing augmented reality by having a camera such as a mobile phone, a portable multimedia player (PMP), a digital broadcasting player, a personal digital assistant (PDA), a music file player (eg, an MP3 player), a portable game terminal, a tablet PC, and a smartphone. Hereinafter, for convenience of explanation, it is assumed that the mobile apparatus 1 is a smart phone.

Referring to FIG. 1, a mobile apparatus 1 according to an embodiment may include a camera 100, a user interface 210, a microphone 220, an outputter 300, a transceiver 400, a storage 500, and a controller 600.

Figure 3:
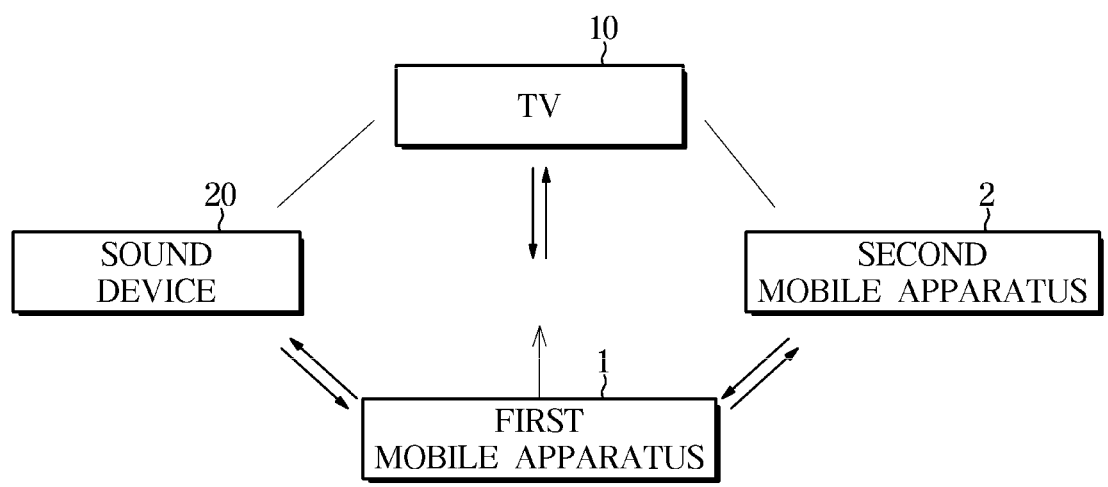
FIG. 3 is a diagram illustrating a network environment between a mobile apparatus and a plurality of devices according to an embodiment.

The camera 100 may obtain an image of the target device by photographing the target device. The controller 600 may identify the content being played on the target device and the object in the content based on the image of the target device photographed by the camera 100. The target device is an electronic device that may be controlled by the mobile apparatus 1, and refers to a display device such as a TV, a sound device, and another mobile apparatus connected to the mobile apparatus 1 through a communication network. Referring to FIG. 3, the target device may include at least one of a second mobile apparatus 2, a TV 10, and a sound device 20.

The camera 100 is a camera module that is typically mounted on the mobile apparatus 1 and may include a lens, an image sensor such as a CCD, and a CMOS, and an analog-to-digital converter. The camera 100 photographs a subject and converts the obtained image into a digital signal and transmits the converted image to the controller 600. The controller 600, which will be described later, may process an image converted into a digital signal.

The user interface 210 receives user's input and transmits it to the controller 600. The user interface 210 may include various user's input means such as a key pad, a dome switch, a touch pad (static pressure/capacitive), a jog wheel, and a jog switch.

In addition, the user interface 210 may be a display 310 equipped with a touch panel. The user interface 210 may be treated in the same way as the display 310 which detects a users input such as a touch gesture and simultaneously displays a processing result of the user's input as an image. The user interface 210 may display a graphic user interface (GUI) that enables control of the mobile apparatus 1 on the display 310. That is, a UI element such as an icon may be displayed on the display 310.

In addition, the user interface 210 may include a motion sensor for detecting the motion of the mobile apparatus 1. The motion sensor may include an acceleration sensor, a gyro sensor, and a geomagnetic sensor. The controller 600 may switch a screen displayed on the display 310 as the mobile apparatus 1 moves in a specific direction.

The microphone 220 may receive an audio signal, convert it into an electrical signal, and transmit it to the controller 600. The microphone 220 receives a user's voice command and transmits it to the controller 600, and the controller 600 may control the mobile apparatus 1 in response to the user's voice command. In addition, the microphone 220 may detect an audio signal output from the target device and transmit it to the controller 600. The controller 600 may identify content played on the target device based on the audio signal output from the target device.

The outputter 300 is a device capable of outputting an image signal or an audio signal, and may correspond to various devices. Specifically, the outputter 300 may include at least one of the display 310 and the speaker 320. The speaker 320 may output audio signals related to various functions of the mobile apparatus 1.

The display 310 may display information input by a user or information provided to a user as various screens. The display 310 displays information processed by the controller 600. For example, the display 310 may display an image of a space photographed by the camera 100 and may display an augmented reality image in which a virtual image is synthesized with the image of the space. The display 310 may display a graphical user interface (GUI) related to various functions of the mobile apparatus 1.

In addition, the display 310 may be used as an input device including a touch panel. The display 310 may be implemented as a liquid crystal display, a thin film transistor liquid crystal display, an organic light-emitting diode, a flexible display, a three-dimensional display.

The transceiver 400 connects the mobile apparatus 1 to a target device or a server through a network or a communication channel. Referring to FIG. 3, a mobile apparatus 1 may be connected to at least one of a second mobile apparatus 2, a TV 10, and a sound device 20 corresponding to a target device to transmit and receive data. In addition, the transceiver 400 may receive information related to an object photographed by the camera 100 from an external server under the control of the controller 600. For example, the transceiver 400 may receive information about content being played on a target device and information related to an object in content being played on a target device from an external server.

The transceiver 400 may include various communication modules. For example, the transceiver 400 may include a communication module connectable to a variety of communication network such as Bluetooth, Zigbee, wireless local area network, home radio frequency (RF), ultra-wide band (UWB), and the Internet.

The storage 500 may store programs and data for controlling the operation of the mobile apparatus 1. In addition, the storage 500 may store input/output data (eg, messages, still images, moving pictures, etc.). The storage 500 may correspond to a memory, and may include a volatile memory such as Static Random Access Memory (S-RAM), Dynamic Random Access Memory (D-RAM), etc., and a nonvolatile memories such as Read Only Memory (ROM), Erasable Programmable Read Only Memory (EPROM), and Electrically Erasable Programmable Read Only Memory (EEPROM) for storing data for a long period of time.

The controller 600 may include a processor that generates a control signal for controlling the operation of the mobile apparatus 1 according to programs and data stored/stored in the storage 500. The processor may include a logic circuit and an operation circuit, and may process data according to a program provided from the storage 500 and generate a control signal according to the processing result.

Also, the processor and the memory may be implemented as separate chips or a single chip. The controller 600 may include a plurality of processors and a plurality of memories.

Referring to FIG. 2, the controller 600 may include a device recognizer 610, a content information processor 620, a virtual image generator 630, and an augmented reality processor 640. The device recognizer 610, the content information processor 620, the virtual image generator 630, and the augmented reality processor 640 may be implemented as separate processors, or may be implemented as one processor.

The device recognizer 610 may recognize a target device in a visual field or field of view of the camera 100 and register it as a control target. Specifically, the device recognizer 610 may recognize a target device by recognizing a specific marker included in the target device. In addition, the device recognizer 610 may recognize a specific space photographed by the camera 100 and recognize the location of the target device within the specific space.

In addition, the device recognizer 610 may recognize a plurality of target devices in a field of view of the camera 100 and register each as a control target. For example, when the TV 10 and the sound device 20 are detected within the field of view of the camera 100, the device recognizer 610 recognizes the TV 10 and the sound device 20 as target devices, and may register them in the control target.

The content information processor 620 may identify content being played on the target device and/or an object in the content based on the image of the target device photographed by the camera 100. Also, the content information processor 620 may obtain information on the identified content and information related to an object in the content from an external server through the transceiver 400.

Also, the content information processor 620 may recognize an object photographed by the camera 100 and obtain content information related to the object from an external server through the transceiver 400.

Content refers to various types of data such as photos, videos, audio, and text. The information related to the identified object may include summary information on the identified object, detailed information on the identified object, and other content information related to the identified object. Information related to the identified object may be defined as additional information.

For example, when the content being played on the target device is video content and the object included in the video content is a person, the additional information may include personal information of a person, other content information related to the person, and the like. Also, when the content being played on the target device is audio content, the additional information may include singer information, lyrics information, other audio content information related to the audio content, video content information related to the audio content, and the like.

The virtual image generator 630 may generate a virtual image for providing an augmented reality image. The virtual image generator 630 may generate a virtual image including content information, additional information, etc. obtained by the content information processor 620. In addition, the virtual image generator 630 may generate a user interface element (UI) for controlling a target device.

The generated virtual image and UI element are capable of interacting with user's input, and the user may select, move, and change a virtual image and a user interface element through the user interface 210.

For example, the virtual image generator 630 may generate an identification marker that displays the result of identification of the object in the content being played on the target device, a virtual image of summary information that displays summary information about the identified object, a virtual image of detailed information displaying detailed information on the identified object, and a virtual image of content information displaying other content information related to the identified object.

In addition, the virtual image generator 630 may generate a UI element such as a play icon, a pause icon, a stop icon, and a volume control icon for controlling the target device.

The augmented reality processor 630 may display the image of the target device and the virtual image together on the display 310. Specifically, the augmented reality processor 630 may generate an augmented reality image obtained by combining an image of a target device and a virtual image, and display the generated augmented reality image on the display 310. The augmented reality processor 630 may control the display 310 to display at least one virtual image including information related to the object generated by the virtual image generator 620 around the image of the target device.

As described above, when present disclosure provides information related to content being played on a target device, an image of the target device and a virtual image including content information are displayed on the display 310 together using augmented reality technology. Accordingly, information may be provided to the user in a more intuitive manner. Also, the user may control the target device more easily.

FIG. 3 is a diagram illustrating a network environment between a mobile apparatus and a plurality of devices according to an embodiment.

Referring to FIG. 3, a mobile apparatus 1 according to an embodiment corresponds to a first mobile apparatus 1. As described above, the first mobile apparatus 1 may be connected to at least one of the second mobile apparatus 2, the TV 10, and the sound device 20 through the transceiver 400. Each of the second mobile apparatus 2, the TV 10, and the sound device 20 also includes a communication module capable of being connected to a network or a communication channel.

When the function for controlling the target device of the first mobile apparatus 1 is executed, the gaze direction of the camera 100 may be a direction in which any one of the second mobile apparatus 2, the TV 10, and the sound device 20 is located. In addition, a plurality of target devices may be included in the field of view (FOV) according to the gaze direction of the camera 100.

The controller 600 of the first mobile apparatus 1 may recognize and register a target device photographed by the camera 100 and generate a control signal for controlling the target device. For example, when only the TV 10 is included in the field of view of the camera 100 of the first mobile apparatus 1, the controller 600 may control the operation of the TV 10 by generating a control signal for controlling the TV 10 in response to a user's input and transmitting the control signal to the TV 10. Details on the control of the target device will be described later.

Figure 4:
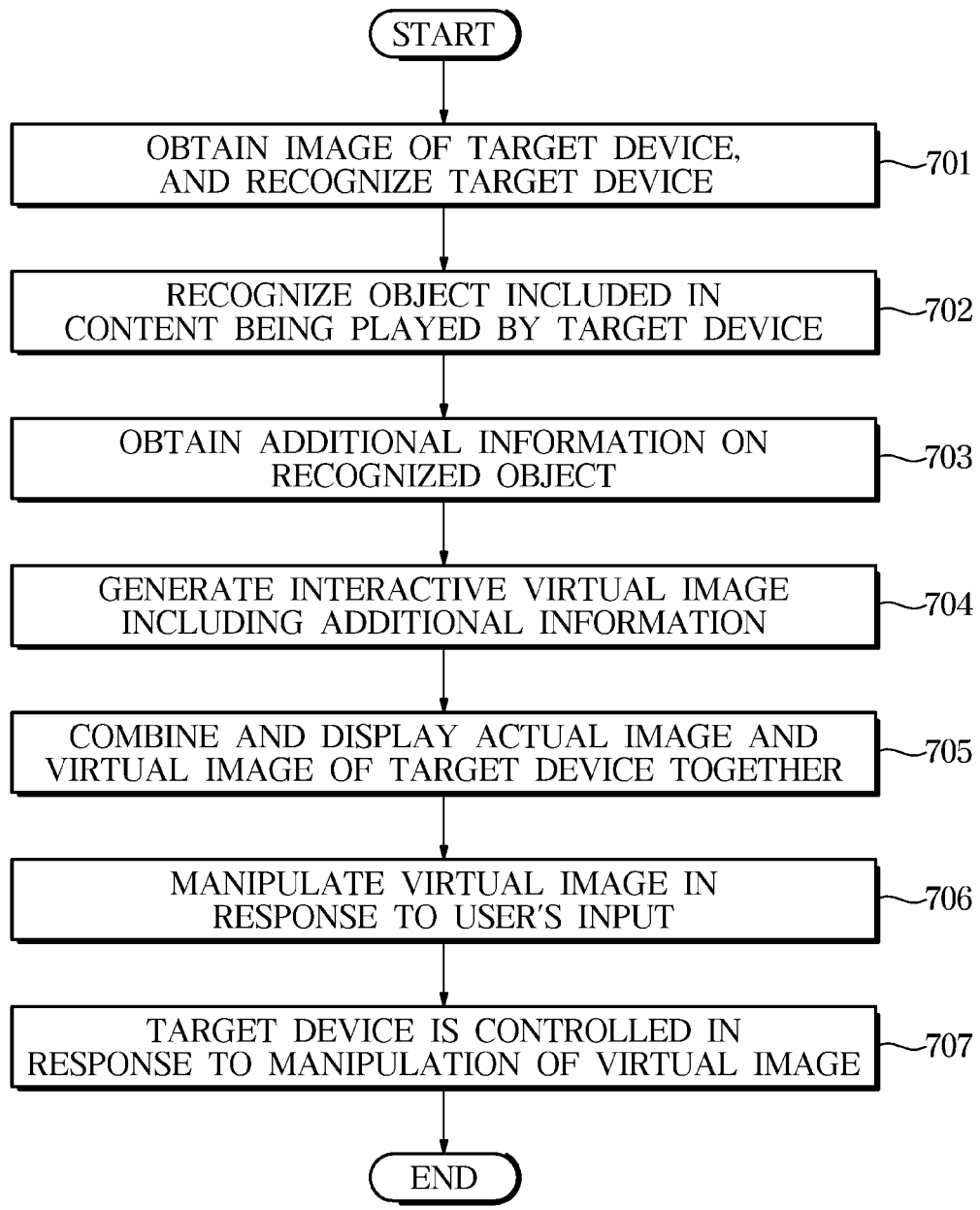
FIG. 4 is a flowchart of a control method of a mobile apparatus according to an embodiment.

FIG. 4 is a flowchart of a control method of a mobile apparatus according to an embodiment. FIG. 4 shows an overall process of providing additional information related to content played on a target device using a mobile apparatus 1 and controlling the target device.

In FIG. 4, it is assumed that the camera 100 of the mobile apparatus 1 photographs only the TV 10 of FIG. 3. Therefore, it is assumed that the target device is the TV 10.

Referring to FIG. 4, the camera 100 of the mobile apparatus 1 obtains an image of a target device, and the controller 600 recognizes the target device photographed by the camera 100 as described above (701). In response to the user's input, the controller 600 recognizes the content being played by the target device and the object included in the content (702). For example, when there is a user's touch input for a specific location of the image of the target device displayed on the display 310, the controller 600 may recognize an object in the content played on the target device and display the recognition result as an identification marker.

Thereafter, the controller 600 obtains additional information on the recognized object (703). As described above, additional information on the recognized object may be obtained from an external server. The additional information may include summary information on the identified object, detailed information on the identified object, and other content information related to the identified object.

The controller 600 generates at least one interactive virtual image including additional information on the identified object (704). As described above, the virtual image is an image generated to provide an augmented reality image. The controller 600 controls the display 310 to display the actual image and the virtual image of the target device together (705). In other words, the controller 600 may display an augmented reality image in which an actual image of a target device and a virtual image are combined on the display 310.

In addition, the controller 600 performs a manipulation on the virtual image in response to a user's input for the virtual image displayed on the display 310 (706). The target device is controlled in response to manipulation of the virtual image (707). For example, when there is a user's input that selects and moves a virtual image that is displayed around the image of the target device and includes specific content information and moves it to the image area of the target device, the controller 600 may control the target device so that content corresponding to the virtual image moved to the image area of the target device is actually displayed on the target device.

Hereinafter, the configuration of the present disclosure will be described in more detail in FIGS. 5 to 24.

Figure 5:
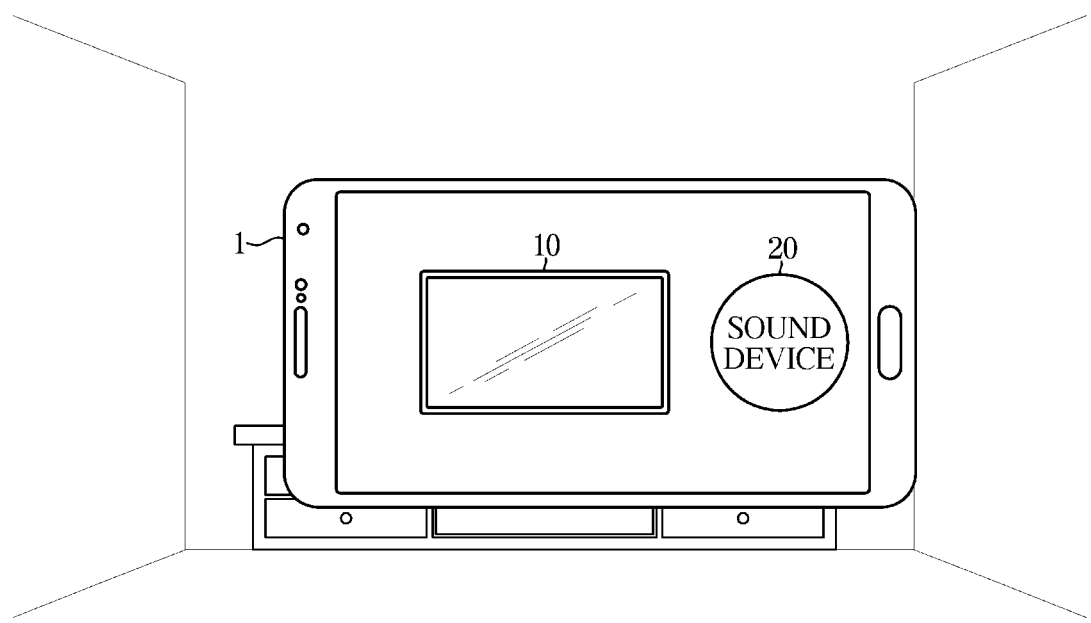
FIG. 5 is a diagram for illustrating a method for a mobile apparatus to recognize a target device according to an embodiment.

FIG. 5 is a diagram for illustrating a method for a mobile apparatus to recognize a target device according to an embodiment.

Referring to FIG. 5, the mobile apparatus 1 may recognize a plurality of target devices and register each as a control target. Specifically, when the TV 10 and the sound device 20 are captured in the field of view of the camera 100 of the mobile apparatus 1, the controller 600 may recognize the TV 10 and the sound device 20 and register them as target devices. A method of recognizing a target device may include a method of recognizing a specific marker included in the target device, a method of using a unique identification number of the target device, a method of identifying a photographed image of the target device by comparing it with learning data, and the like.

Figure 6:
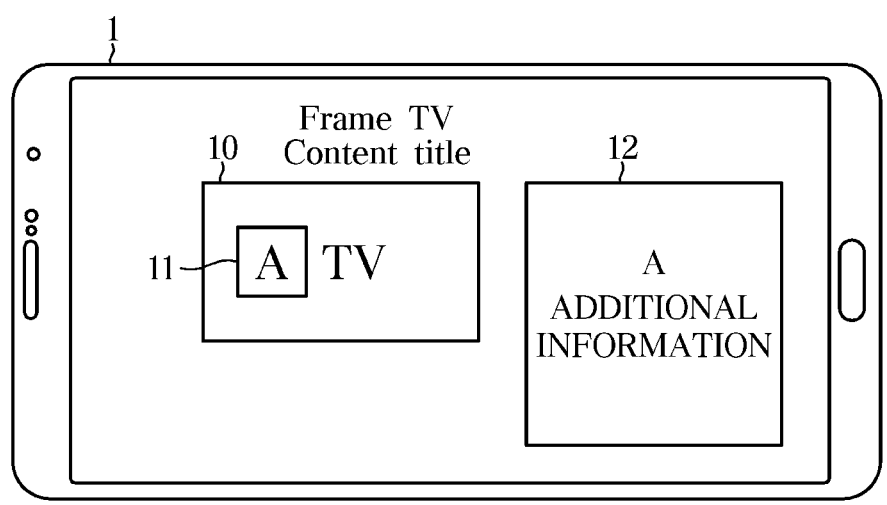
FIGS. 6 and 7 show examples of recognizing content being played on a target device and displaying information related to the content on a display.
Figure 7:
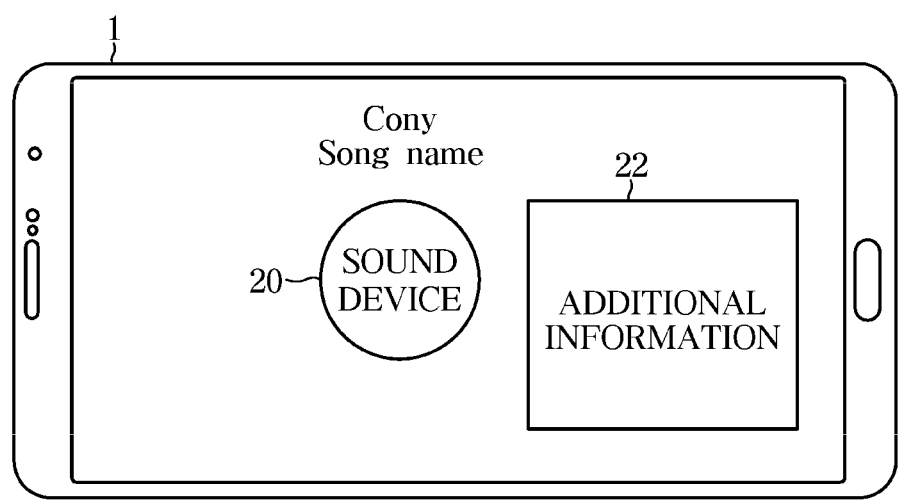

FIGS. 6 and 7 show examples of recognizing content being played on a target device and displaying information related to the content on a display.

In FIG. 6, the target device is a TV 10. The controller 600 may recognize content being played on the target device 10 displayed on the display 310. When there is a user's input that selects an object A included in the content being played on the target device 10, the controller 600 may identify the selected object A and display the identification marker 11 on the display 310 as an identification result. Meanwhile, the controller 600 may identify the object A included in the content being played on the target device 10 irrespective of the user's input.

In addition, if the content being played on the target device 10 is a video, a screen displayed on the display of the target device 10 may be switched. In this case, the object in the video displayed on the target device 10 may be changed. The controller 600 may identify the changed object in response to the user's selection input for the changed object.

The controller 600 may receive additional information related to the identified object A from an external server (not shown). As described above, the information related to the identified object A may include summary information on the identified object A, detailed information on the identified object A, and other content information related to the identified object.

In addition, the controller 600 may generate a virtual image 12 including additional information on the identified object A and display it on the display 310. When both the image of the target device 10 and the virtual image 12 including additional information on the identified object A are displayed in the display 310 area, the image of the target device 10 and the virtual image 12 may be displayed at different locations within the display 310 area. Also, only summary information on the identified object A may be displayed in the virtual image 12.

When the screen displayed on the target device 10 is switched and the object in the content displayed on the target device 10 is changed, additional information displayed on the virtual image 12 may be changed to information related to the changed object. The additional information displayed on the virtual image 12 may be changed according to the user's selection input for the changed object or automatically changed.

In FIG. 7, the target device is a sound device 20. The controller 600 may identify a sound source being reproduced by the sound device 20 based on the audio signal output from the sound device 20. The controller 600 may receive information related to the identified sound source from an external server (not shown), and may generate a virtual image 22 including information related to the identified sound source. The controller 600 may control the display 310 to display the image of the sound device 20 and the virtual image 22 together.

In this way, since the present disclosure may display the image of the target device existing in the field of view of the camera 100 and the content played on the target device and/or information related to the object in the content together on the display 310, users may obtain information in a more intuitive way.

Figure 8:
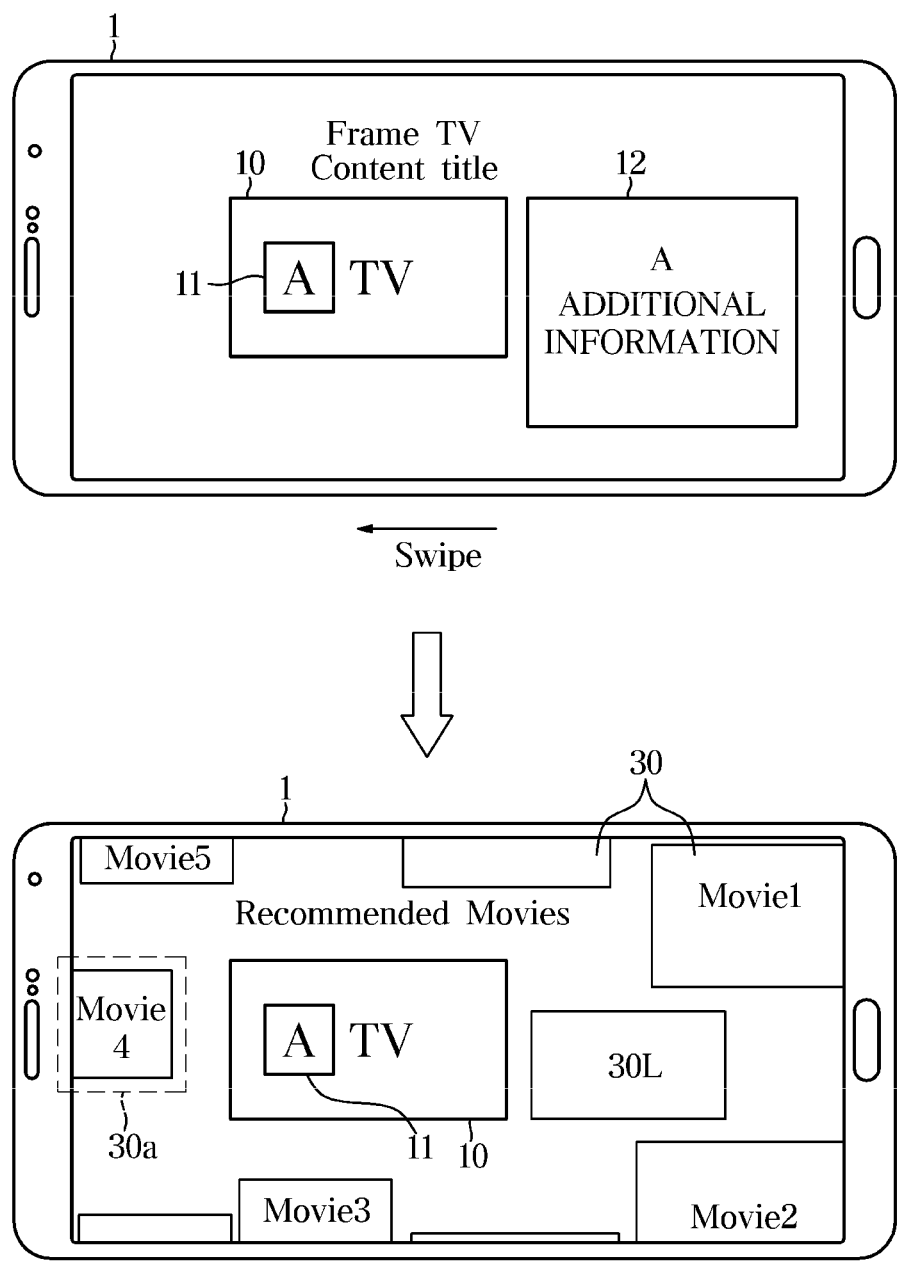
FIGS. 8 and 9 show examples of displaying information related to a recognized object as a virtual image.
Figure 9:
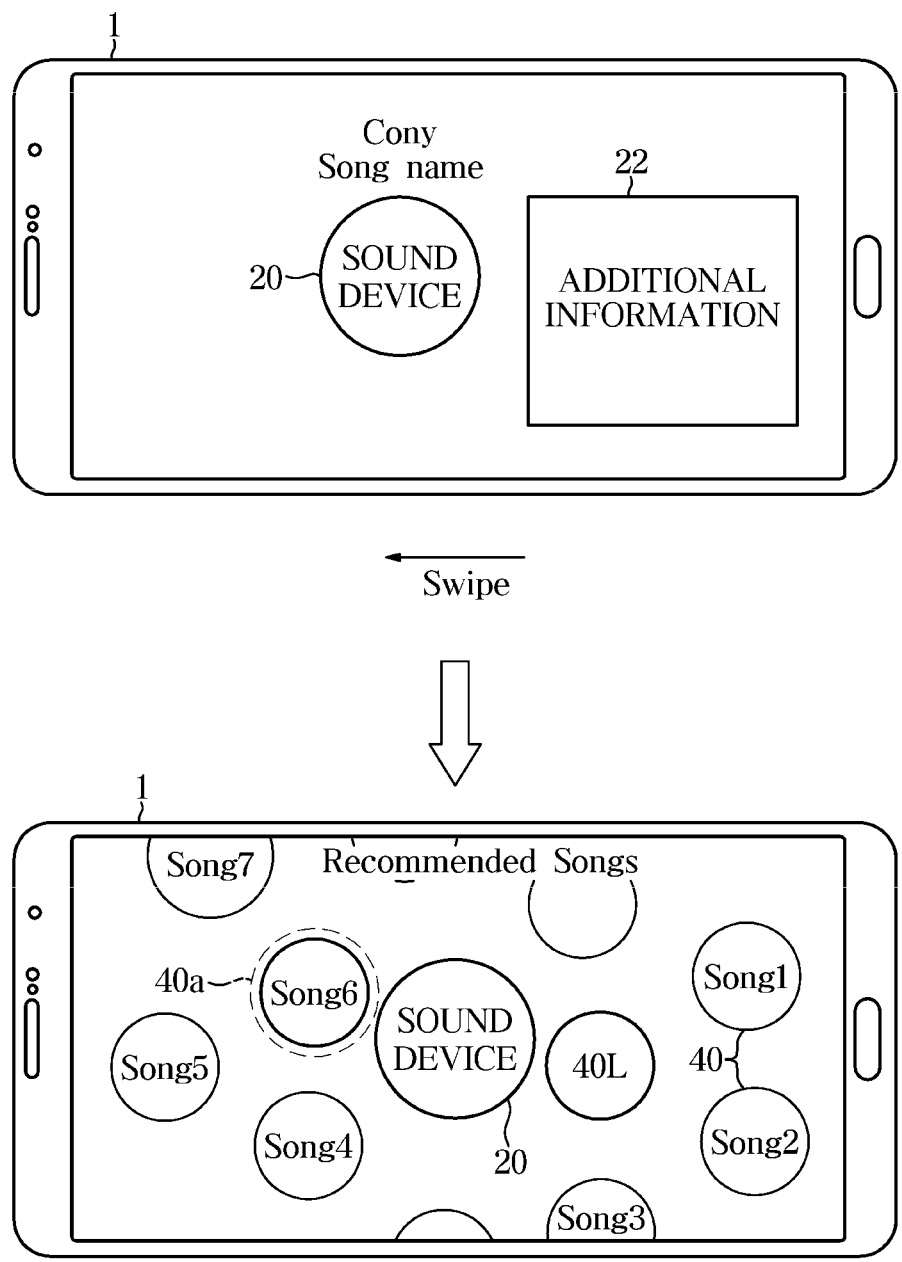

FIGS. 8 and 9 show examples of displaying information related to a recognized object as a virtual image.

Referring to FIG. 8, the controller 600 may control the display 310 to display at least one virtual image including information related to an object around an image of a target device in a field of view of a camera.

For example, while the summary information virtual image 12 including summary information on the object A in the content being played on the target device (TV) 10 is displayed on the display 310, when a user's swipe gesture is input to an arbitrary area of the display 310, the controller 600 may control the display 310 to display at least one virtual image 30 including other content information related to the identified object A around the target device 10.

At least one virtual image 30 including other content information related to the identified object A may include a thumbnail image of content playable on the target device 10.

At least one virtual image 30 including different content information may be arranged in various patterns. For example, at least one virtual image 30 including other content information is arranged in a circular shape to surround the image 10 of the target device, or in a vertical direction or a diagonal direction around the image 10 of the target device.

At least one virtual image 30 including different content information may be displayed for each category. Content for each category may be received from an external server (not shown). For example, the content category may be classified into a music video category, a movie category, and a photo category.

While at least one virtual image 30 corresponding to the first category is displayed around the image 10 of the target device, when a user's swipe gesture is input to an arbitrary area on the display 310, the controller 600 may display at least one virtual image (not shown) corresponding to the second category around the image 10 of the target device on the display 310. In this case, at least one virtual content image 30 corresponding to the first category is not displayed on the display 310 and may be displayed again according to a user's swipe gesture input.

In addition, the controller 600 may control the display 310 to enlarge and display at least one virtual image 30 including different content information according to the movement of the mobile apparatus 1 and the gaze direction of the camera 100. Specifically, as the user moves the mobile apparatus 1, the gaze direction of the camera 100 may be changed within a range in which the target device 10 is included in the field of view of the camera 100. In this case, the virtual image 30a positioned in the center line direction of the field of view of the camera 100 may be enlarged and displayed. In FIG. 8, the virtual image of Movie 4 is located in the center line direction of the field of view of the camera 100, and thus the virtual image of Movie 4 is enlarged and displayed (30a). In this way, by enlarging the virtual image located in the direction in which the camera 100 gazes, the visual effect may be increased.

In addition, the controller 600 may control the target device 10 to play content corresponding to the enlarged virtual image 30a according to the gaze direction of the camera 100.

FIG. 9 shows a case where the target device is the sound device 20, and the controller 600 may control display 310 to display at least one virtual image 40 including other content information related to the identified sound source around the image of the sound device 20 in response to the user's swipe gesture input. In addition, a virtual image of Song 6 located in the center line direction of the field of view of the camera 100 may be enlarged and displayed 40a. In this way, the controller 600 may generate different virtual images according to the type of target device and display them on the display 310.

FIGS. 10 to 16 show examples of controlling a target device using a graphic user interface displayed on a display. In FIGS. 10 to 16, it will be described that the target device is the TV 10.

Referring to FIG. 10, in response to a users input selecting any one of at least one virtual image 30 including content information, the controller 600 may control the target device 10 to output first content corresponding to the selected virtual content image 30s.

That is, when the user selects the virtual image 30s including the content information of A among the virtual images 30, the target device 10 plays the content A. Each of the at least one virtual image 30 may include different content information, and A and Movie 2 to Movie 6 may be video.

Meanwhile, when the target device 10 is outputting the A content, the controller 600 may control the display 310 to display a virtual image 32 including other content information related to the A content. That is, when content reproduced on the target device 10 is changed, information related to the changed content may be displayed as a virtual image.

Figure 11:
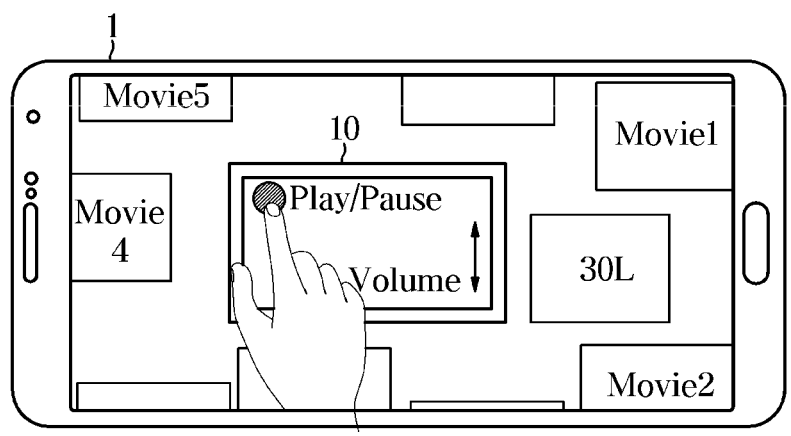

FIG. 11 illustrates how a user controls a target device by inputting a specific gesture to the image 10 of the target device. Specifically, in a state in which the target device is present in the field of view of the camera 100 of the mobile apparatus 1, and the image 10 of the target device is displayed on the display 310, a user's touch on the image 10 of the target device may be input. In this case, the controller 600 may generate a play/pause control signal of the target device and transmit it to the target device. Accordingly, the target device plays, pauses, or stops the content.

In addition, when a vertical drag gesture is input on the image 10 of the target device, the controller 600 may generate a volume control signal of the target device in response to a user's input and transmit it to the target device. The volume of the target device is adjusted accordingly.

Meanwhile, control of the target device is also possible through voice commands. When a user's voice command is input through the microphone 220 while the target device is included in the field of view of the camera 100 of the mobile apparatus 1, the controller 600 may generate a control signal for controlling a target device in response to a user's voice command and transmit the control signal to the target device.

FIG. 12 is a diagram for illustrating displaying content by dividing a display area of a target device.

Referring to FIG. 12, in response to a user's input for additionally selecting and moving at least one virtual image 30 including content information, the controller 600 divides the display area of the target device 10 into a first area and a second area, and may control the target device 10 to display the first content 30p and the second content 30s corresponding to the additionally selected virtual image in the first area and the second area, respectively. In addition, the controller 600 may control the target device 10 to change the positions of the first area and the second area in response to a user's input.

Specifically, while the first content 30p is displayed in the display area of the target device, when the user selects a virtual image 30s including second content information and inputs a gesture to move to the image 10 of the target device displayed on the display 310 of the mobile apparatus 1, the target device may be controlled to output both first content and second content.

That is, the controller 60 may divide the display area of the target device into a plurality of pieces in response to a user's input, and simultaneously display a plurality of contents in the divided areas.

Conversely, while both the first content and the second content are displayed on the target device, when a user's gesture of selecting the second content display area included in the image 10 of the target device and moving it outside the image 10 of the target device is input, the virtual image 30s corresponding to the second content may be displayed again outside the image 10 area of the target device. At this time, the target device plays the first content.

In addition, the controller 600 may control the target device to adjust the size of the first area and the second area in response to the user's zoom input for the first area or the second area of the target device image 10. For example, when the user inputs a gesture of zooming in the first area where the first content is displayed with respect to the image 10 of the target device displayed on the display 310, the controller 600 may generate a control signal that enlarges an area in which first content is being reproduced among the display area of the target device and transmits it to the target device. Accordingly, the target device may enlarge and display the first content display area, and reduce and display the second content display area.

Figure 13:
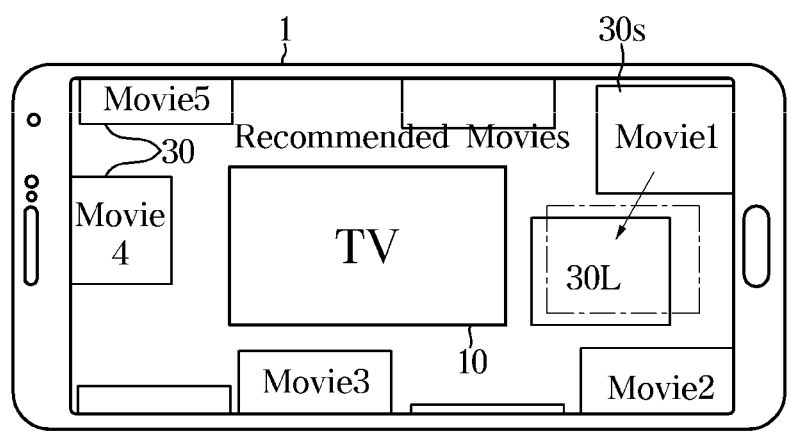

Referring to FIG. 13, the controller 600 may display a play list area 30L on the display 310. In response to a user's gesture input of selecting any one of the at least one virtual image 30 including content information and moving it to the play list area 30L, the controller 600 may control the display 310 to move and display the selected virtual image 30s to the play list area 30L.

When the virtual image 30 is additionally selected and moved to the play list area 30L, the controller 600 may control the display 310 to overlap and display partial regions of a plurality of virtual images included in the playlist region 30L.

Referring to FIG. 14, the controller 600 may control the target device so that content played on the target device is changed in response to a user's swipe gesture input to the play list area 30L. For example, when a swipe gesture for the playlist area 30L is input while the target device is playing content A, the controller 600 may generate a control signal for playing the B content set in the next playback order and transmit the generated control signal to the target device. Accordingly, the target device plays the B content. At this time, in the play list area 30L displayed on the display 31 of the mobile apparatus 1, C content information having the next playback order is displayed.

Figure 15:
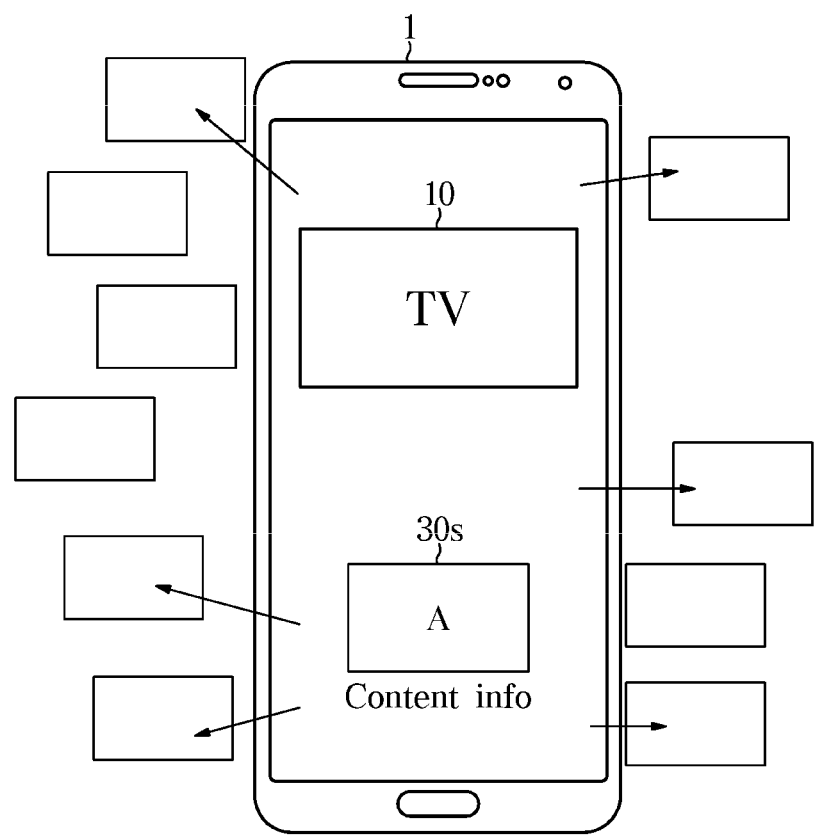

Referring to FIG. 15, when there is a user's input selecting any one of at least one virtual image 30 including content information, the controller 600 may control the display 310 to enlarge the size of the selected virtual image 30s and display a motion of pushing unselected virtual images out of the display 310 area of the mobile apparatus 1. Through this visual effect, the user may easily check the selected virtual image.

Figure 16:
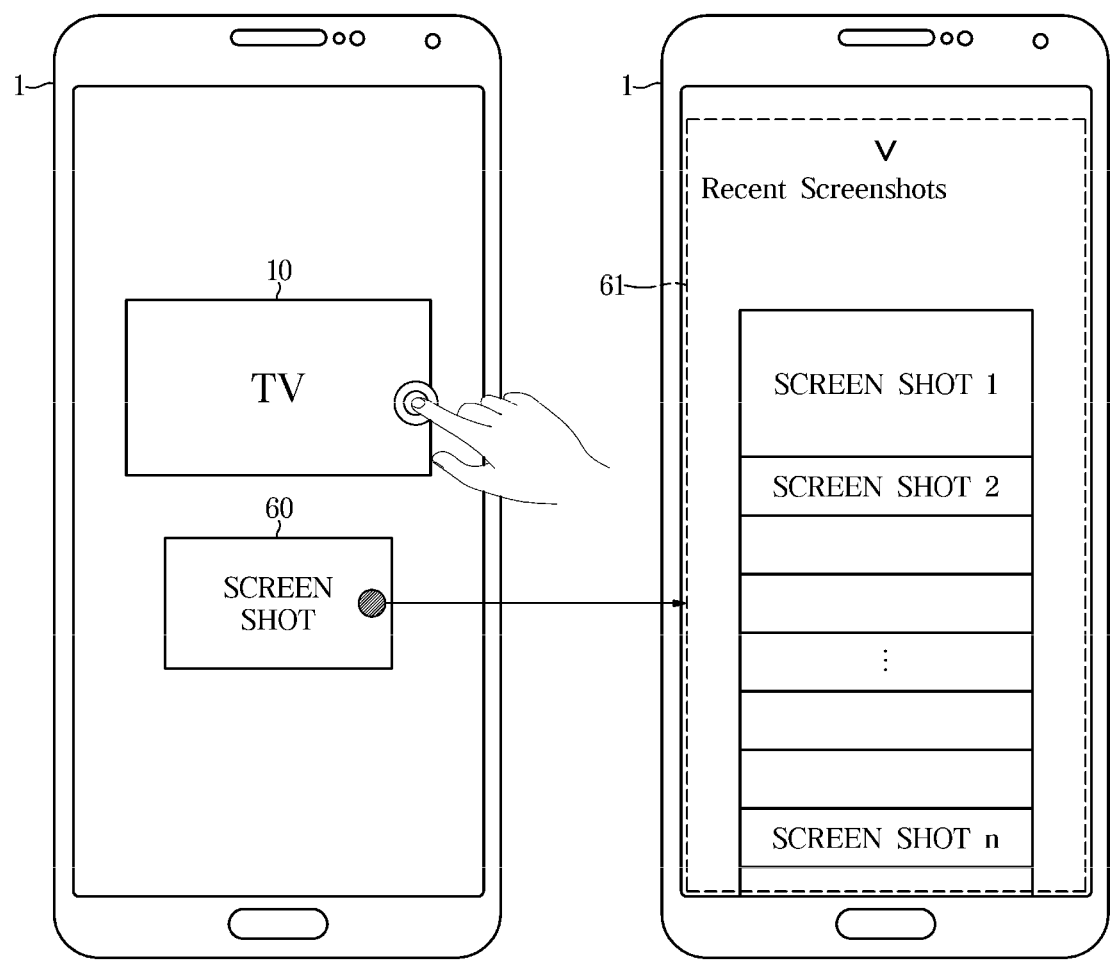

Referring to FIG. 16, in response to a user's input to an image 10 of a target device displayed on the display 310, the controller 600 may generate a screenshot of a screen displayed on the display of the target device. Specifically, in response to user's input touching the image 10 of the target device twice in succession, the controller 600 may instantaneously capture a screen displayed on a display of the target device and store the captured screen in the storage 500.

Also, when a screenshot of the screen being displayed on the target device's display is created, the controller 600 may control the display 310 to display the screenshot image 60 in an area different from the image 10 area of the target device.

In addition, in response to a user's touch input to the screenshot image area 60, the controller 600 may control the display 310 to display a screen including a list of screenshot images stored in the storage 500.

FIGS. 17 to 20 are diagrams for illustrating switching of a screen displayed on a display according to a movement of a mobile apparatus.

Figure 17:
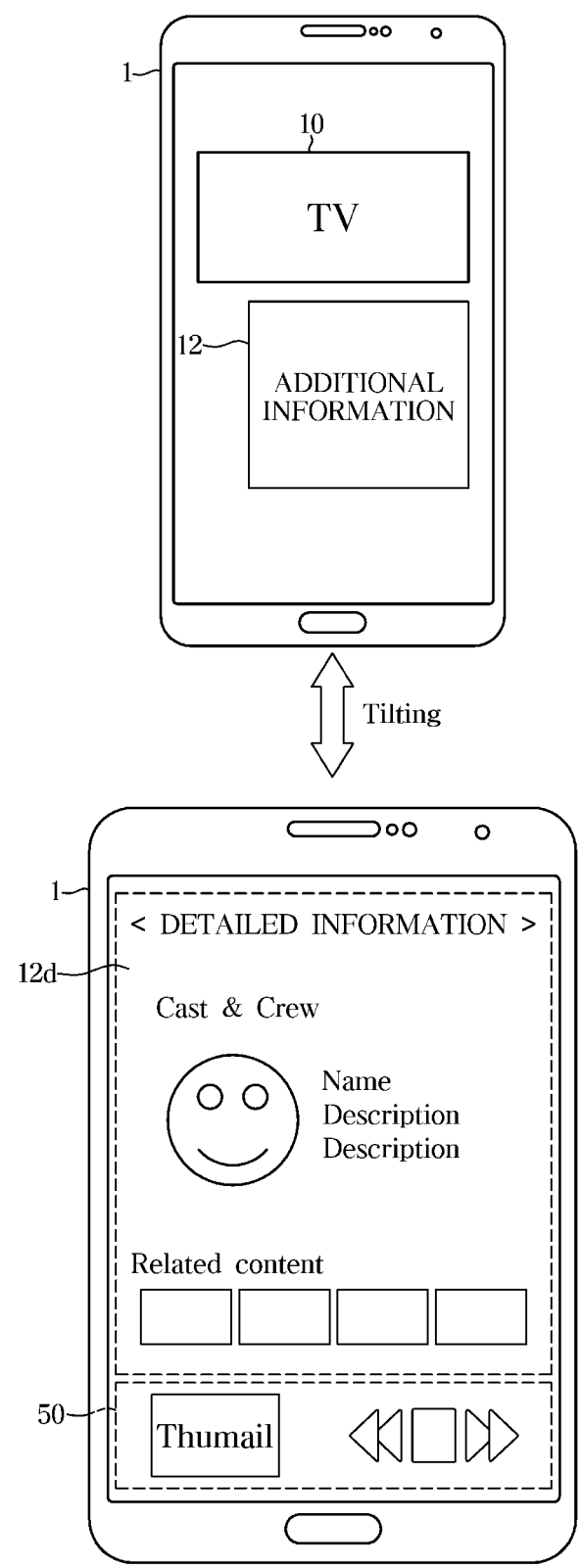

Referring to FIG. 17, in response to a user's input tilting the mobile apparatus 1, the controller 600 may control the display 310 to display a screen providing detailed information related to an object included in the content being played on the target device.

Specifically, while a virtual image 12 including summary information on objects included in the content being played on the target device is displayed on the display 310 of the mobile apparatus 1 together with the image 10 of the target device, when the motion of tilting the mobile apparatus 1 downward is detected by the user interface 210, the controller 600 may control the display 310 to display a screen including detailed information on an object included in the content being played on the target device.

When the mobile apparatus 1 is tilted downward, the target device moves out of the field of view of the camera 100, so the controller 600 may display a screen including detailed information on an object by switching a screen displayed on the display 310.

In addition, a detailed information display area 12d displaying detailed information on an object and a control menu display area 50 displaying a control menu for a target device may be displayed together on the display 310.

The control menu for the target device may include a thumbnail of the content being played on the target device, a content title, a previous button, a next button, and a play/pause button.

Figure 18:
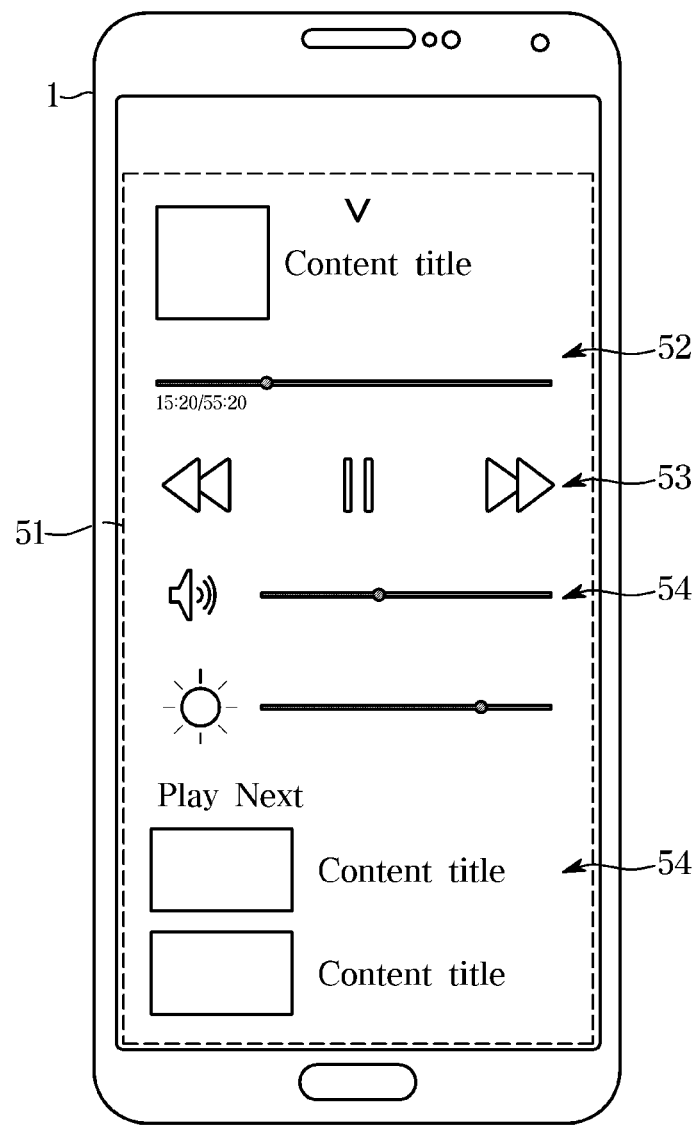

Referring to FIG. 18, when there is a user's touch input to the control menu display area 50, the controller 600 may control the display 310 so that the UI elements 52, 53, 54, and 55 included in the control menu are expanded and displayed 51.

Referring to FIG. 19, in response to a user's input tilting the mobile apparatus 1, the controller 600 may control the display 310 to display a screen providing information on contents corresponding to each of at least one virtual image as a list.

Specifically, in a state in which at least one virtual image 30 including related content information along with the image 10 of the target device is displayed on the display 310 of the mobile apparatus 1, when the motion of tilting the mobile apparatus 1 downward is detected by the user interface 210, the controller 600 may display a screen that provides content information included in each of at least one virtual image as a list 30 on the display 310.

In addition, a content list display area 33 displaying content information as a list and a control menu display area 50 displaying a control menu for a target device may be displayed together on the display 310.

Figure 20:
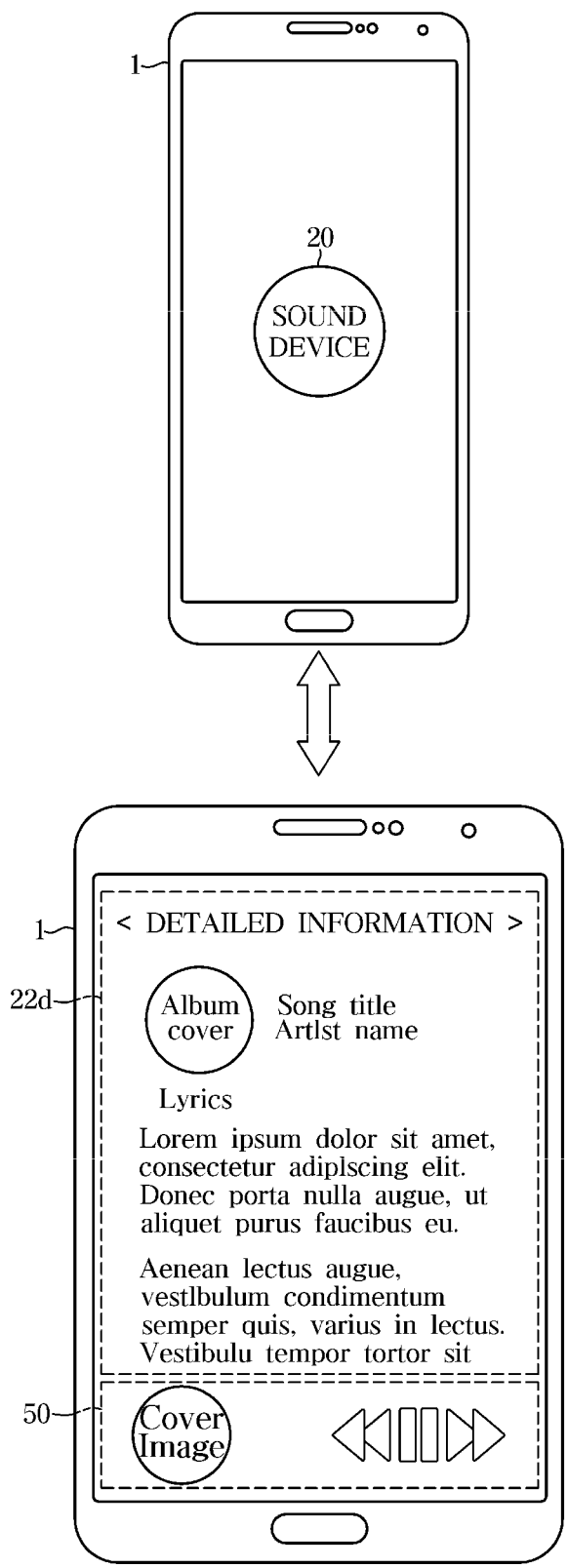

Referring to FIG. 20, even when the target device is the sound device 20, a screen displayed on the display 310 may be switched in response to the tilting movement of the mobile apparatus 1.

Specifically, in a state where the display 310 of the mobile apparatus 1 displays the image 20 of the sound device and the virtual image 12 including summary information about the sound source being played on the sound device 20, when the motion of tilting the mobile apparatus 1 downward is detected by the user interface 210, the controller 600 may control the display 310 to display a screen including detailed information on the sound source being played by the sound device 20.

In addition, a detailed information display area 22d including a title and lyrics of a sound source and a control menu display area 50 displaying a control menu for a target device may be displayed on the display 310 together.

Figure 21:
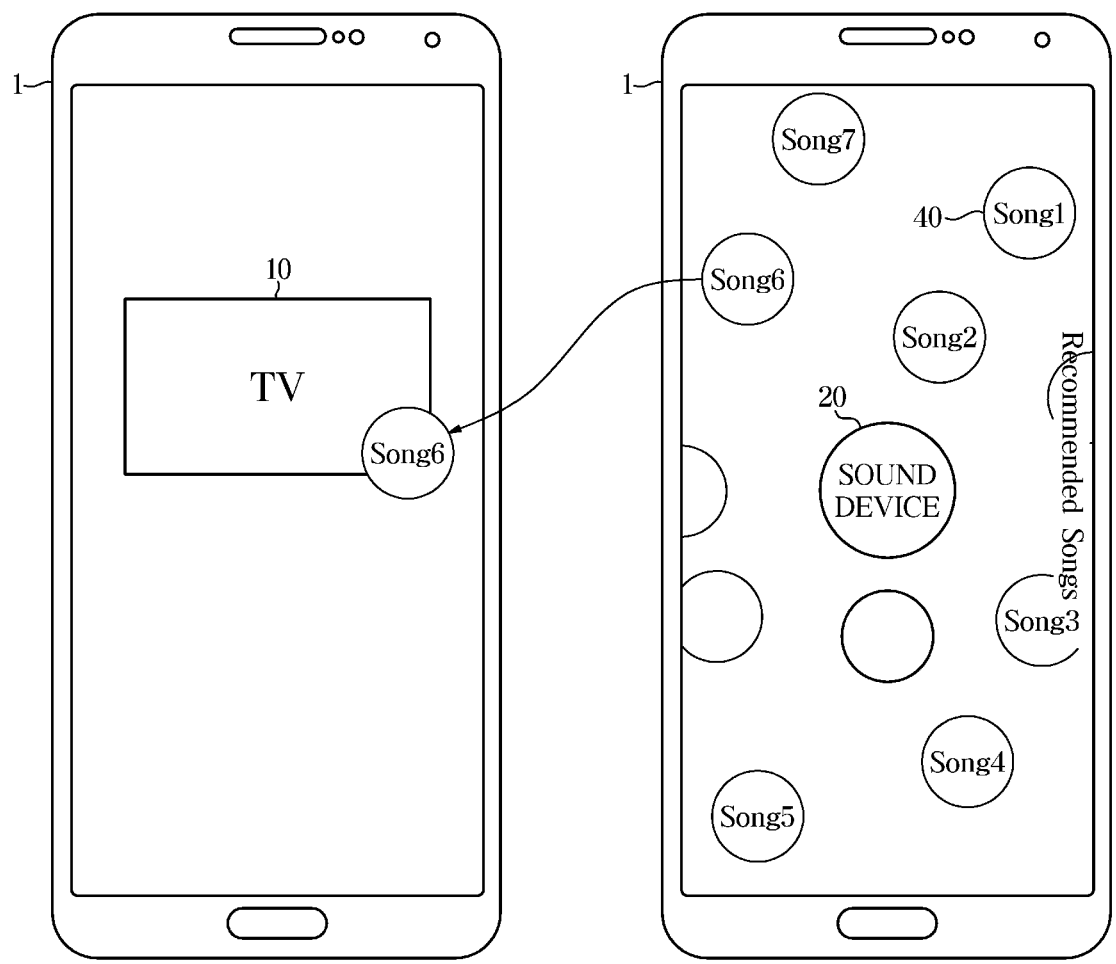
FIG. 21 is a diagram for illustrating a method in which a plurality of devices are linked and controlled through a mobile apparatus according to an embodiment.

FIG. 21 is a diagram for illustrating a method in which a plurality of devices are linked and controlled through a mobile apparatus according to an embodiment.

Referring to FIG. 21, the controller 600 may link and control a plurality of target devices in response to a user's input. Specifically, while the camera 100 photographs the sound device 20, a plurality of virtual images 40 including content information around the image of the sound device 20 and the image of the sound device 20 are displayed on the display 310. While the user selects any one (Song 6) of a plurality of virtual images 40 and moves the mobile apparatus 1 at the same time to move the gaze direction of the camera 100 to the TV 10, the selected virtual image (Song 6) may be transferred to the image of the TV 10 displayed on the display 310. Accordingly, the TV 10 plays Song 6.

Meanwhile, when a virtual image including related content information related to content played on the TV 10 is transferred to an image of the sound device 20, the sound device 20 outputs an audio signal included in the related content.

In this way, the present disclosure may register a plurality of devices, and control a plurality of devices simultaneously or in conjunction according to the movement of the visual field or field of view of the camera.

Figure 22:
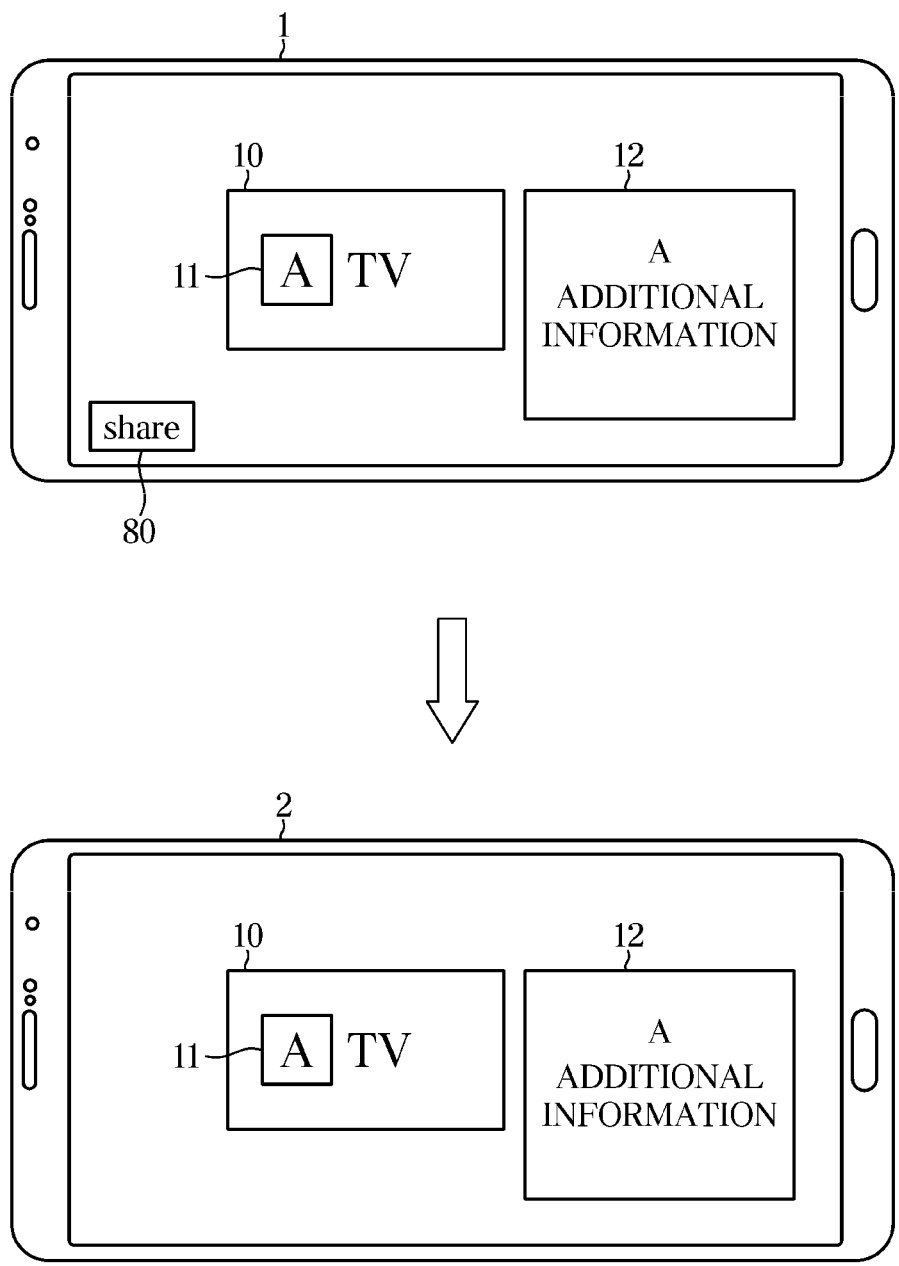
FIGS. 22 and 23 are diagrams for illustrating content sharing between a mobile apparatus and another mobile apparatus according to an embodiment.
Figure 23:
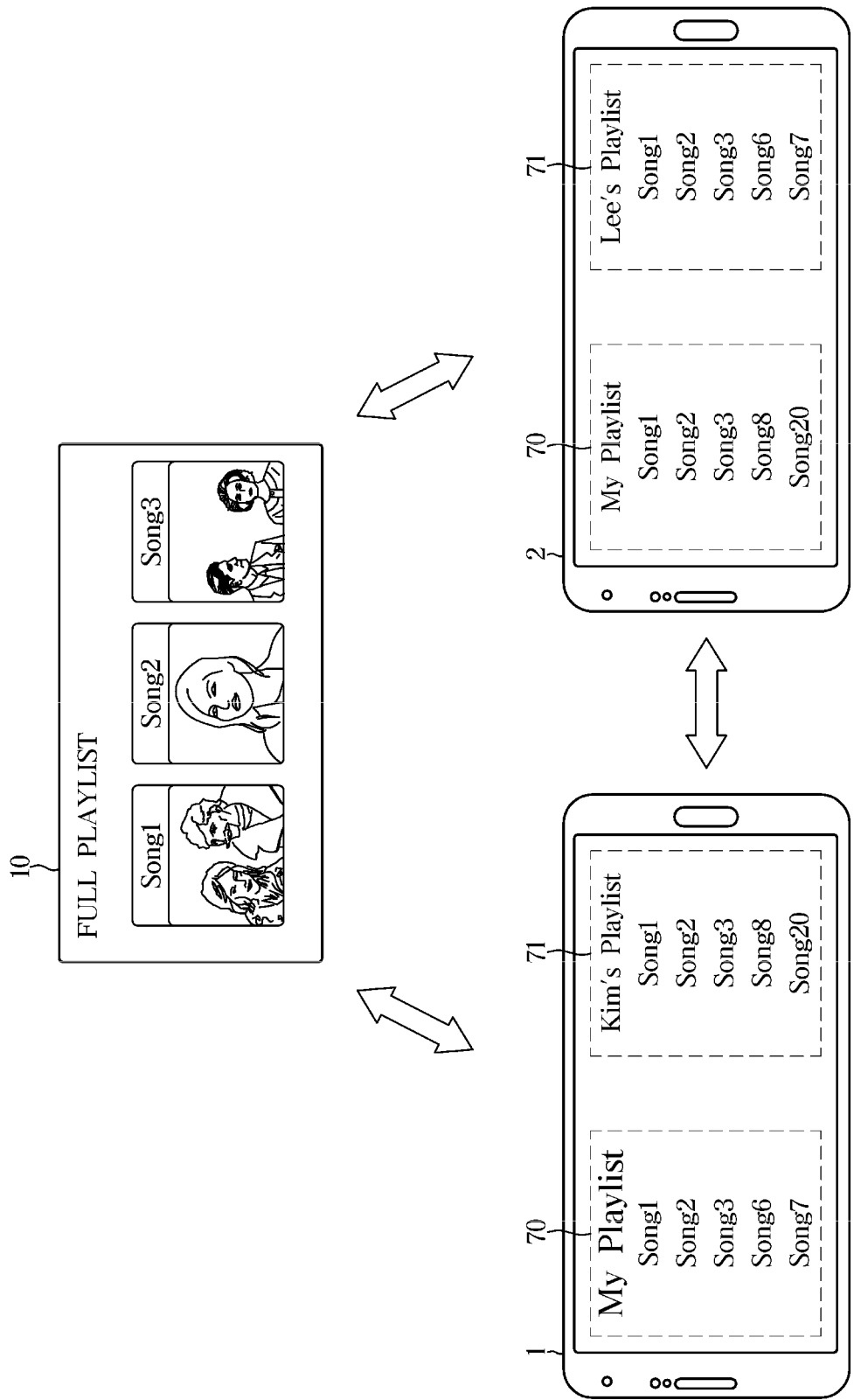

FIGS. 22 and 23 are diagrams for illustrating content sharing between a mobile apparatus and another mobile apparatus according to an embodiment.

Referring to FIG. 22, the mobile apparatus 1 may connect a first external device distinguished from a target device through a transceiver 400. The controller 600 may control the transceiver 400 to transmit a screen displayed on the display 310 to a first external device in response to a user's input requesting sharing of a screen displayed on the display 310.

For convenience of explanation, the mobile apparatus 1 is referred to as a first mobile apparatus 1 and the first external device is referred to as a second mobile apparatus 2. In FIG. 22, the first mobile apparatus 1 photographs the TV 10, identifies the object A in the content being played on the TV 10, and displays an identification marker 11 and a virtual image 12 including additional information related to the object A on the display 310. In addition, the controller 600 may display a share icon 80 on the display 310 together.

The controller 600 may transmit a screen displayed on the display 310 of the first mobile apparatus 1 to the second mobile apparatus 2 in response to a user's touch input to the share icon 80. Accordingly, the second mobile apparatus 2 outputs the same screen as the first mobile apparatus 1.

Referring to FIG. 23, a first mobile apparatus 1, a second mobile apparatus 2, and a target device (TV) 10 are connected. The first mobile apparatus 1 may transmit content information stored in the storage 500 to the second mobile apparatus 2 and the target device 10, and the second mobile apparatus 2 may also transmit content information stored in the storage to the first mobile apparatus 1 and the target device 10.

Accordingly, the first mobile apparatus 1 may display the content information 70 stored in the storage 500 and the content information 71 stored in the second mobile apparatus 2 on the display 310. The second mobile apparatus 2 may also display the stored content information 70 and the content information 71 stored in the first mobile apparatus 1. The target device 10 may display all content information stored in the first mobile apparatus 1 and the second mobile apparatus 2.

Accordingly, a plurality of users may share the content, and the shared content may be played through the target device.

Figure 24:
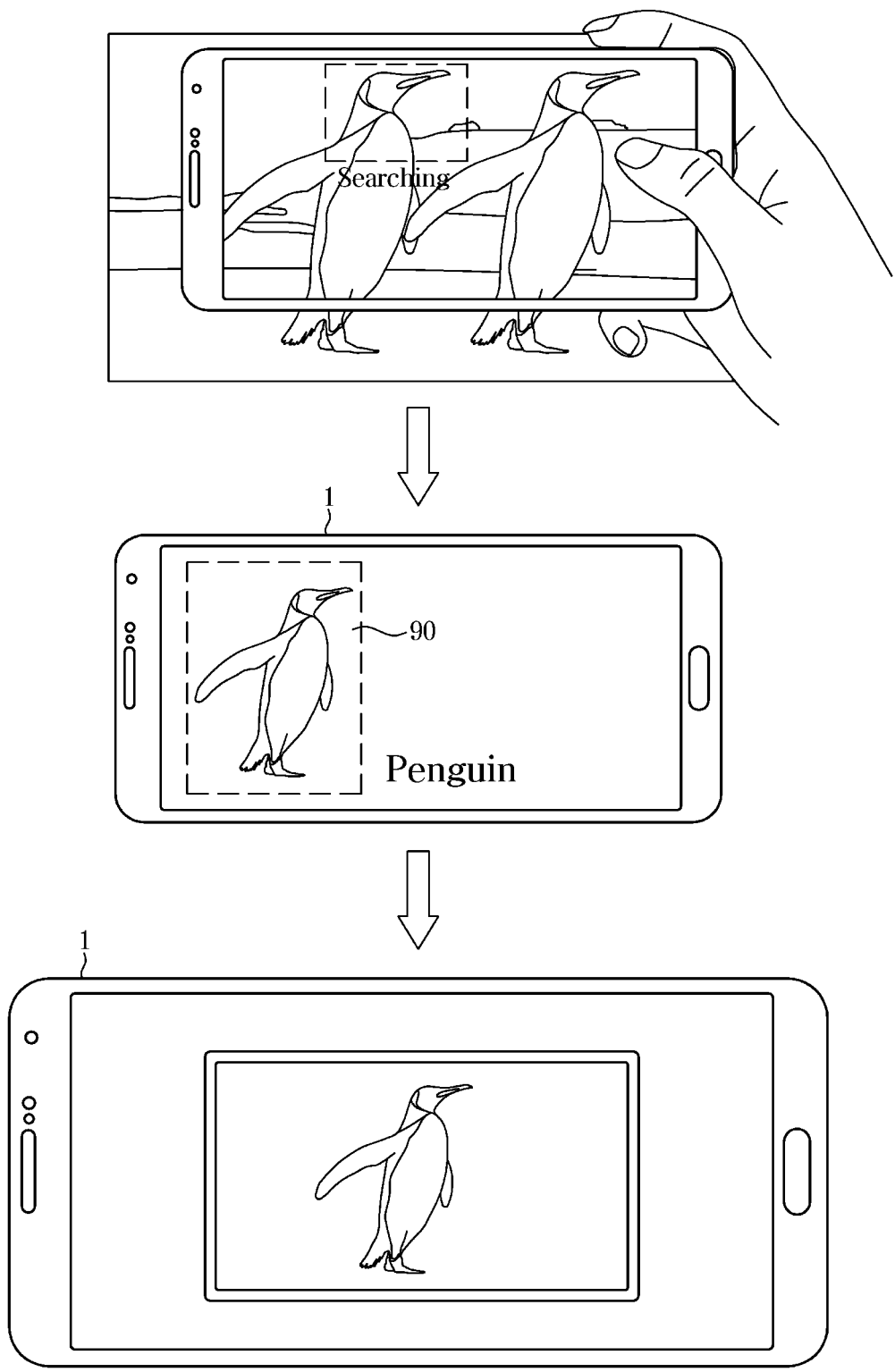
FIG. 24 shows another example of displaying information related to an object recognized through a camera on a target device.

FIG. 24 shows another example of displaying information related to an object recognized through a camera on a target device.

Referring to FIG. 24, the mobile apparatus 1 may search information on an object recognized through the camera 100 from an external server (not shown), and display the search information 90 on the display 310. In addition, the mobile apparatus 1 may control the target device 10 so that the target device 10 displays search information 90 about an object displayed on the display 310.

According to a mobile apparatus and a control method of a mobile apparatus, contents played on a target device within the visual field or field of view of the camera and objects within the content may be recognized, and a graphic user interface (GUI) for providing information related to an object in the content and controlling a target device may be displayed together on the display. Therefore, the user may obtain information in a more intuitive manner and control the target device more easily.

In addition, according a mobile apparatus and to a control method of a mobile apparatus according to an aspect, a plurality of devices may be registered, and a plurality of devices may be controlled simultaneously or in association with the movement of the visual field or the field of view of the camera.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

The invention claimed is:

1. A mobile apparatus comprising:
a display;
a camera configured to obtain an image of a target device;
a user interface including circuitry configured to receive a user's input; and
a controller configured to:
in response to a user's input for displaying the image of the target device, control the display to display the image of the target device and at least one virtual image including information related to an object included in content being played by the target device around the image of the target device within a field of view (FOV) of the camera, and
in response to a user's input for selecting at least one of the image of the target device and the at least one virtual image, transmit a control signal related to the selecting to the target device,
wherein the controller is further configured to:
in response to a center line of the FOV of the camera being moved according to a movement of the mobile apparatus, control the display to enlarge any one of the at least one virtual image located along a moving direction of the center line of the FOV of the camera, and
transmit a control signal related to an enlarged virtual image to the target device to control the target device to play content corresponding to the enlarged virtual image.

2. The mobile apparatus according to claim 1, wherein the controller is configured to transmit a control signal related to output of content to the target device to control the target device to output the content corresponding to the selected virtual image, in response to a user's input for selecting and moving any one of the at least one virtual image.

3. The mobile apparatus according to claim 2, wherein the content is first content, and the controller is configured, in response to a user's input for additionally selecting and moving any one of the at least one virtual image, to transmit a control signal related to the additionally selecting and moving to the target device to control the target device to:
  divide an output area of the target device into a first area and a second area, and
  output the first content, and a second content corresponding to the additionally selected virtual image, in the first area and the second area, respectively.

4. The mobile apparatus according to claim 3, wherein the controller is configured to transmit a control signal related to adjusting to the target device to control the target device to adjust a size of the first area and a size of the second area, in response to a user's zoom input for the first area or the second area of the target device.

5. The mobile apparatus according to claim 1, wherein the controller is configured to control the display to display a screen providing detailed contents of information related to the object, in response to a user's input tilting the mobile apparatus.

6. The mobile apparatus according to claim 1, wherein the controller is configured to control the display to display a screen providing information on contents corresponding to each of the at least one virtual image as a list, in response to a user's input tilting the mobile apparatus.

7. A control method of a mobile apparatus, the control method comprising:
  obtaining an image of a target device using a camera;
  in response to a user's input for displaying the image of the target device using a user interface including circuitry, displaying on a display the image of the target device and identifying an object included in content being played by the target device;
  displaying at least one virtual image including information related to the identified object around the image of the target device within a field of view (FOV) of the camera; and
  in response to a user's input for selecting at least one of the image of the target device and the at least one virtual image, transmitting a control signal related to the selecting to the target device;
  in response to a center line of the FOV of the camera being moved according to a movement of the mobile apparatus, controlling the display to enlarge any one of the at least one virtual image located along a moving direction of the center line of the FOV of the camera, and
  transmitting a control signal related to an enlarged virtual image to the target device to control the target device to play content corresponding to the enlarged virtual image.

8. The control method according to claim 7, further comprising:
  transmitting a control signal related to output of content to the target device to control the target device to output the content corresponding to the selected virtual image, in response to a user's input for selecting and moving any one of the at least one virtual image.

9. The control method according to claim 8, wherein the content is first content, and
  the controlling the target device comprises, in response to a user's input for additionally selecting and moving any one of the at least one virtual image, transmitting a control signal related to the additionally selecting and moving to control the target device to:
    divide an output of the target device into a first area and a second area, and
    output the first content, and a second content corresponding to the additionally selected virtual image, in the first area and the second area, respectively.

10. The control method according to claim 7, further comprising:
  displaying a screen providing detailed contents of information related to the object on the display in response to a user's input tilting the mobile apparatus.

11. The control method according to claim 7, further comprising:
  displaying a screen providing information on contents corresponding to each of the at least one virtual image as a list on the display in response to a user's input tilting the mobile apparatus.

* * * * *